2 Sheets--Sheet 1.
J. W. MIXTER.
Saw-Gummers.
No. 152,302. Patented June 23, 1874.
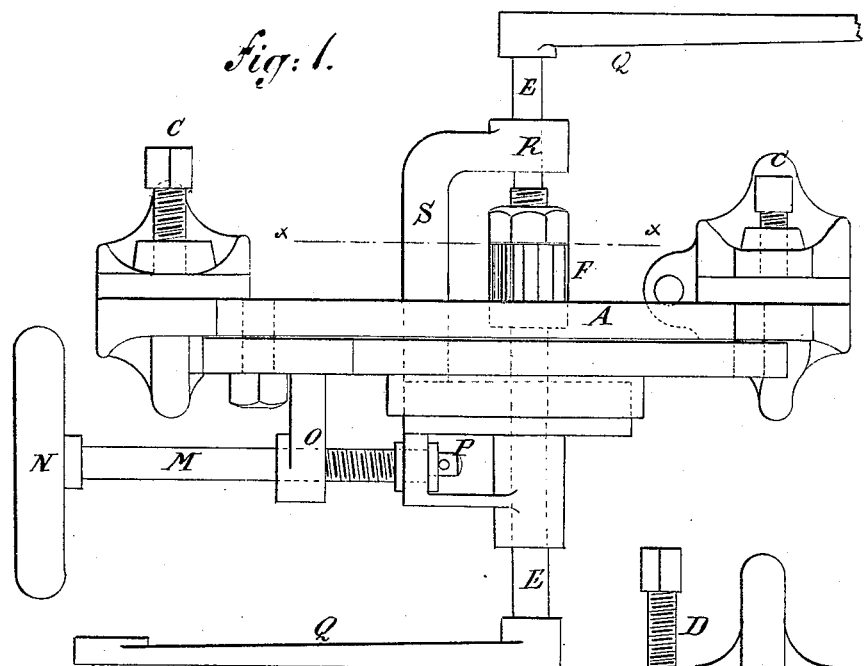
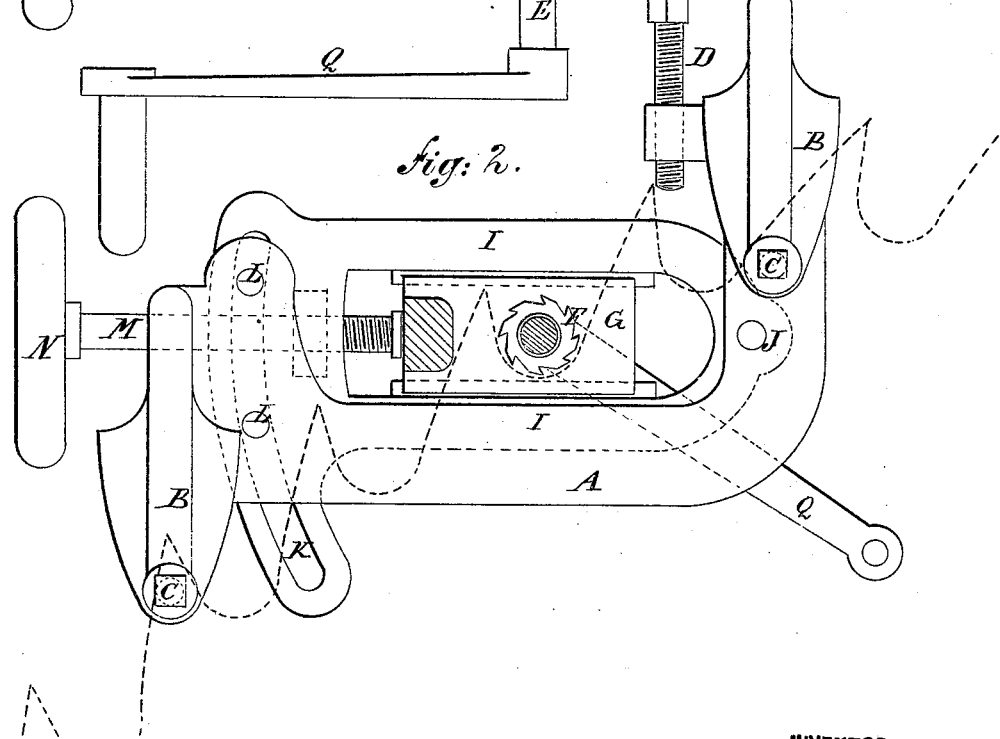
WITNESSES:
INVENTOR:

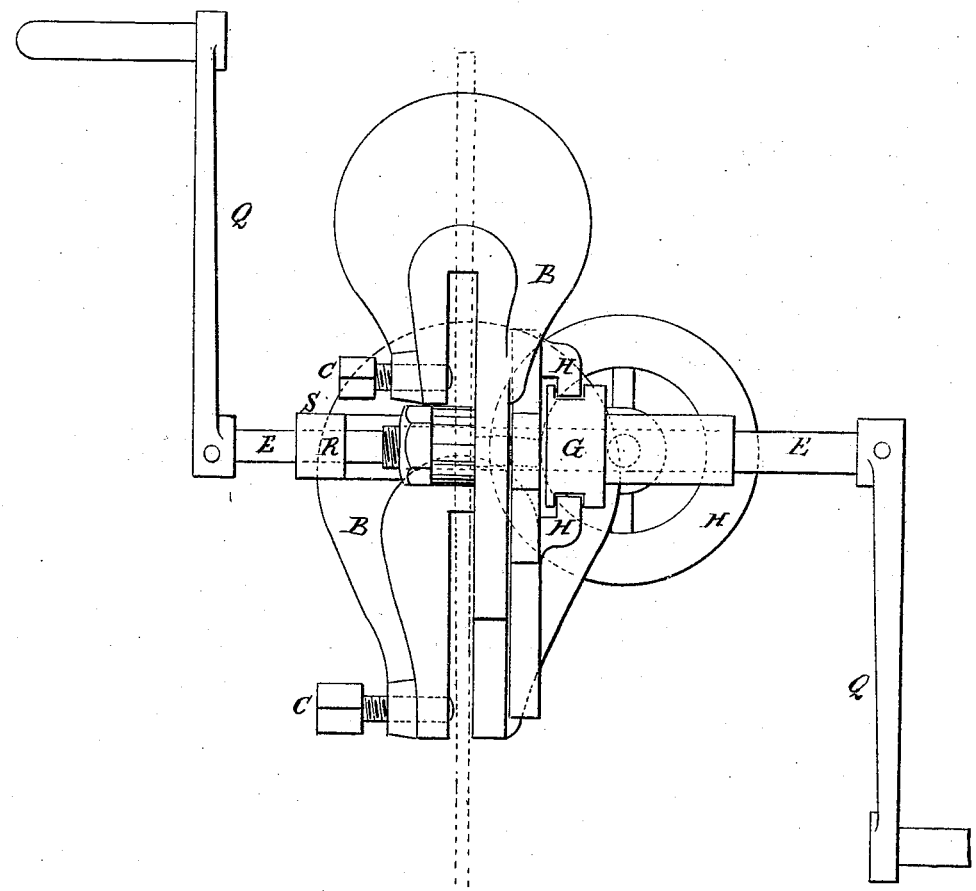

UNITED STATES PATENT OFFICE.

JASON W. MIXTER, OF TEMPLETON, MASSACHUSETTS.

IMPROVEMENT IN SAW-GUMMERS.

Specification forming part of Letters Patent No. 152,302, dated June 23, 1874; application filed April 4, 1874.

*To all whom it may concern:*

Be it known that I, JASON W. MIXTER, of Templeton, in the county of Worcester and State of Massachusetts, have invented a new and useful Improvement in Saw-Gummers, of which the following is a specification:

The invention will first be fully described, and then pointed out in the claim.

In the accompanying drawing, Figure 1 is a view of the under or reverse side of the machine. Fig. 2 is a side view, partly in section, on the line $x$ $x$ of Fig. 1, showing the saw in dotted lines. Fig. 3 is an end view, showing the saw and shaft and clamping-jaws in detail in dotted lines.

Similar letters of reference indicate corresponding parts.

A is the portion of the machine to which the saw is clamped. B B are the clamping-jaws, which are slotted to admit the saw, as seen in Fig. 2. The saw is fastened in these jaws by means of the set-screws C, and the position of the saw is governed by the gage-screw D. E is the cutter-shaft. F is the hollow cutter thereon. The shaft is confined in a carriage, G, which slides in the ways H. I is the frame on which the ways are cast. This frame is pivoted to the part A at the point J, which allows the carriage and cutter-shaft to be raised and adjusted, as may be desired. The frame I is held in position by means of the curved slot K in the end opposite the pivot, and by the set-screws L L, which enter the part A. M is the feed-screw, which is turned by means of the hand-wheel N, and works through the ear O of the adjustable frame as through a nut, its end being attached to the carriage G by means of collars and a pin. (Seen at P, Fig. 1.) Q is a crank on each end of the cutter-shaft for operating the cutter.

As gumming-machines have been heretofore constructed, the carriage-ways are cast on the machine, so that the carriage and cutter cannot be adjusted to alter the direction of the cut, and the cutter being placed upon the end of the shaft, but one journal-bearing and but one crank can be used.

By attaching the carriage and cutter-shaft and feed-screw to an adjustable "way"-frame, I am enabled to vary the direction of the cutter so as to cut more toward the center of the saw, if desired.

I am also enabled to support the cutter-shaft by an outer bearing, R, on a curved arm, S, and to use two cranks instead of one for operating the machine. This machine may be applied to either straight or circular saws, and without taking the latter from their arbors. The cutter is made detachable, so that it may be changed to adapt it to the diameter or size of the saw.

Having thus described my invention, I claim as new, and desire to secure by Letters Patent—

The combination, with the cutter-shaft carriage, of the ways H H, attached to a frame, I, pivoted at J, and adjustable in a curved slot, K, as and for the purpose specified.

JASON W. MIXTER.

Witnesses:
FRANK HUTCHINSON,
L. C. PARMENTER.